(No Model.)
H. SEE.
EXTRACTOR FOR REMOVING AIR, GREASE, AND SEDIMENT FROM FEED WATER.
No. 439,695. Patented Nov. 4, 1890.
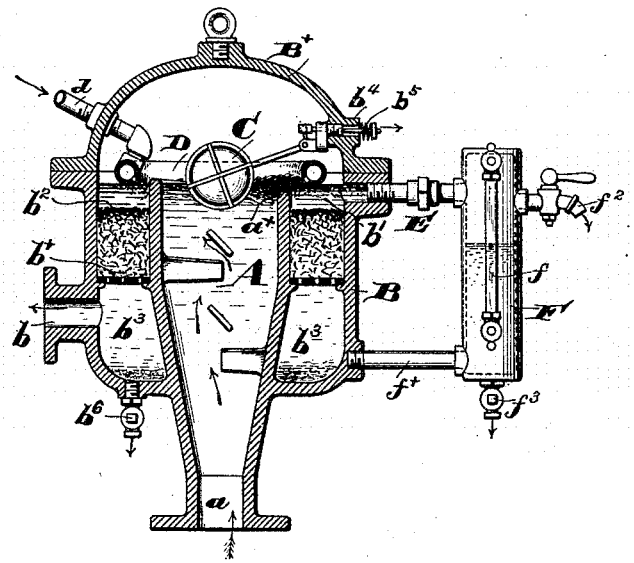
WITNESSES:
Lewis Altmaur
J. H. Dixon
Horace See,
INVENTOR:
By his attorneys,
W. C. Strawbridge,
J. Bonsall Taylor

UNITED STATES PATENT OFFICE.

HORACE SEE, OF NEW YORK, N. Y.

EXTRACTOR FOR REMOVING AIR, GREASE, AND SEDIMENT FROM FEED-WATER.

SPECIFICATION forming part of Letters Patent No. 439,695, dated November 4, 1890.

Application filed July 30, 1890. Serial No. 360,391. (No model.)

*To all whom it may concern:*

Be it known that I, HORACE SEE, a citizen of the United States, residing in the city, county and State of New York, have invented certain new and useful Improvements in Extractors for Removing Air, Grease and Sediment from Feed Water, of which the following is a specification.

My invention relates to a well known class of devices, the object of which is to free feed water from grease, air, and sediment, usually existing in the feed water tanks of boilers by being carried thereinto by the exhaust steam ordinarily employed to heat the feed water.

The object of my invention is the construction of an inexpensive and durable extractor and separator, by the employment of which the feed water is permanently freed from the impurities referred to.

Apparatus embodying a good form of my invention is represented in the accompanying drawing, which is a central, vertical, sectional elevation of my entire apparatus, and is hereinafter described, the particular subject-matter which I claim as novel being hereinafter definitely specified.

In the drawing A represents a central, vertical, inlet chamber, open at its upper extremity and preferably cylindriform; through which at or near its lower extremity the feed water enters through an inlet $a$. The upper extremity of the inlet chamber is preferably lower at the side which in the drawing is the right hand side, so that the overflow from said chamber when full and in operation is toward the right hand side. This lower edge of said chamber I designate the overflow edge $a^x$.

Circumscribing the inlet chamber is a preferably cylindriform inclosing case B, between the inner walls of which and the exterior walls of the inlet chamber exists an annular space conveniently divided by a central horizontal perforated diaphragm $b^x$ into an upper chamber which I call the filtering-chamber $b'$ and which contains filtering material $b^2$, and into a lower chamber, which I call the settling chamber $b^3$, out of the upper portion of which leads a feed water discharge pipe $b$ to the boiler, and out of the lower portion or bottom of which leads a sediment discharge pipe $b^6$. The inclosing case is preferably cast integral with the inlet chamber, and it is surmounted and inclosed by a cover $B^x$ fitted air-tight upon it. Within the walls of this cover is an air discharge $b^4$, within which is an air valve $b^5$ of any preferred construction, that represented being suitable for the purpose, which as to its stem is operated by a crank-provided float C of a well known character, which rides upon the surface of the feed water within the inlet chamber, and rises or falls with said water so as to open or close the air valve and permit the escape of air from within the upper portion of the inclosing case.

D is a steam coil closely surrounding the upper open edge of the inlet chamber, and conveniently supplied with live steam from the boiler through a steam inlet pipe $d$ which passes through the cover $B^x$.

E is a grease outlet, leading from the filtering chamber of the case above the level of the filtering material and directly in front of the overflow edge $a^x$ of the inlet chamber. This grease outlet leads into a vertical collecting chamber F, provided with a glass gage $f$, with a grease-withdrawing spigot $f^2$ at its upper portion, and with a water-withdrawing cock $f^3$ at its lower. The collecting chamber is conveniently supported below by a rod or bracket $f^x$.

Such being a description of a good form of my apparatus, its operation is as follows:—

The feed water, entering through the inlet $a$, fills the inlet-chamber and overflows into the filtering chamber, passing through the filtering material therein down into the settling chamber whence it escapes through the feed water discharge pipe $b$. In passing over the overflow edge of the inlet chamber the temperature of the water is raised by the steam in the coil to the boiling point, in order to cause the oil to become separated from the water in the form of scum and to remain on top so as to flow into the collecting chamber through the grease outlet E. Any water carried over with the scum settles to the bottom of the collecting chamber, the scum remaining on top to be drawn off at will through the grease spigot $f^2$. The gage indicates the relative position of the oil and scum and water. The water freed from the grease which passes down through the filtering material, is practically filtered free from sediment and deposit, but, should any such remain, it will deposit in the settling chamber from which it can be drawn off by the sediment discharge pipe, $b^6$. The float maintains the requisite water level by regulating the amount of air above the water. The application of heat to the feed water is advantageous as raising the water more nearly to the temperature of the steam generated in the boiler, before the water is introduced thereinto.

It will now be understood that the principal advantages of the apparatus are the fact that the feed water as it runs over the inlet chamber is not only by being heated more readily freed from grease and scum, but is heated and subsequently filtered free of any solid matter which fails to be carried off through the grease outlet, and is also by the settling chamber freed from deposits which the filtering medium may not remove.

Having thus described my invention, I claim and desire to secure by Letters Patent:—

1. In combination, the inlet-chamber, the inclosing case embodying both a filtering chamber and a settling chamber, the grease outlet from the inclosing case, the steam coil in said case, and the float-controlled air valve, substantially as and for the purposes set forth.

2. In combination, the inlet chamber, the inclosing case embodying both a filtering chamber and a settling chamber, the grease outlet from the inclosing case, the steam coil in said case, the collecting chamber, and the float-controlled air valve, substantially as and for the purposes set forth.

3. In combination with the inlet chamber having an overflow edge $a^x$, the inclosing case circumscribing the inlet chamber and having a filtering chamber which surrounds said inlet chamber below said overflow edge, and a grease outlet from said case in adjacency to said overflow edge and above the filtering chamber, substantially as set forth.

4. In combination, the inlet chamber, the inclosing case provided both with an upper filtering chamber below the level of the upper edge of the inlet chamber and with a settling chamber below said filtering chamber and which has a feed water discharge above its bottom and a sediment discharge through its bottom, a steam coil in the upper portion of the inclosing case in adjacency to the upper edge of the inlet chamber, a float-controlled air valve within the inclosing case, and a grease outlet above the filtering chamber in adjacency to the overflow edge of the inlet chamber, substantially as set forth.

5. In combination, the inlet chamber, the inclosing case provided with an upper filtering chamber below the level of the upper edge of the inlet-chamber, and with a settling chamber below said filtering chamber and which has a feed water discharge above its bottom and a sediment discharge through its bottom, a steam coil in the upper portion of the inclosing case in adjacency to the upper edge of the inlet chamber, a float-controlled air valve within the inclosing case, a grease outlet above the filtering chamber in adjacency to the overflow edge of the inlet chamber, and a collecting chamber into which said grease outlet leads and which is provided at its upper portion with a grease discharge pipe and at its lower portion with a water discharge pipe, substantially as set forth.

In testimony that I claim the foregoing as my invention I hereunto sign my name this 28th day of July, A. D. 1890.

HORACE SEE.

Witnesses:
WILLIAM MOLLOY,
CHAS. A. RILEY.